(12) United States Patent
Satou et al.

(10) Patent No.: US 6,350,406 B1
(45) Date of Patent: Feb. 26, 2002

(54) METHOD OF MANUFACTURING ANODE UNIT FOR SOLID ELECTROLYTIC CAPACITOR, ANODE UNIT FOR SOLID ELECTROLYTIC CAPACITOR, CONTINUOUS SINTERING APPARATUS, AND METHOD OF MANUFACTURING SECONDARY PARTICLES OF VALVE-ACTION METAL POWDER

(75) Inventors: Hideaki Satou; Yoshio Ida, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/704,683

(22) Filed: Nov. 3, 2000

(30) Foreign Application Priority Data

Nov. 4, 1999 (JP) ............................................. 11-313339

(51) Int. Cl.$^7$ .............................. B22B 3/24; B22B 1/00
(52) U.S. Cl. ............................. 419/25; 419/26; 419/23; 419/31; 75/228; 266/250; 266/259; 148/513
(58) Field of Search ............................. 419/25, 26, 23, 419/31; 75/228; 148/513; 266/250, 259

(56) References Cited

U.S. PATENT DOCUMENTS

| | | | | |
|---|---|---|---|---|
| 4,189,129 A | * | 2/1980 | Engelhard | ................... 266/251 |
| 4,234,168 A | * | 11/1980 | Kajinaga et al. | ............. 266/128 |
| 4,534,935 A | * | 8/1985 | Ambrose et al. | .............. 419/23 |
| 4,964,906 A | * | 10/1990 | Fife | .............................. 75/369 |
| 5,448,447 A | * | 9/1995 | Chang | ........................ 361/529 |
| 5,993,513 A | * | 11/1999 | Fife | .............................. 75/743 |
| 6,193,779 B1 | * | 2/2001 | Riechert et al. | ............... 75/343 |
| 6,238,456 B1 | * | 5/2001 | Wolf et al. | ..................... 75/245 |

FOREIGN PATENT DOCUMENTS

| | | |
|---|---|---|
| JP | 2-39417 A | 2/1990 |
| JP | 2-310301 A | 12/1990 |

* cited by examiner

*Primary Examiner*—Ngoclan Mai
(74) *Attorney, Agent, or Firm*—McGinn & Gibb, PLLC

(57) ABSTRACT

A method of manufacturing a sintered anode unit for a solid electrolytic capacitor is provided. According to this method, a press-molded or compacted pellet of a valve-action metal powder is sintered at a predetermined high temperature and in a predetermined primary vacuum. The pellet is naturally cooled in this primary vacuum, and is cooled by force cooling in an inert gas atmosphere. Thereafter, the sintered pellet is subjected to a repeated cycle processing of vacuum, atmospheric leakage, and vacuum in a gradual-oxidizing chamber. The atmospheric leakage level is increased step by step to set the vacuum level in the gradual-oxidizing chamber to the atmospheric pressure. Then, the sintered pellet having the restricted content of oxygen is taken out from the gradual-oxidizing chamber into the atmosphere.

13 Claims, 3 Drawing Sheets

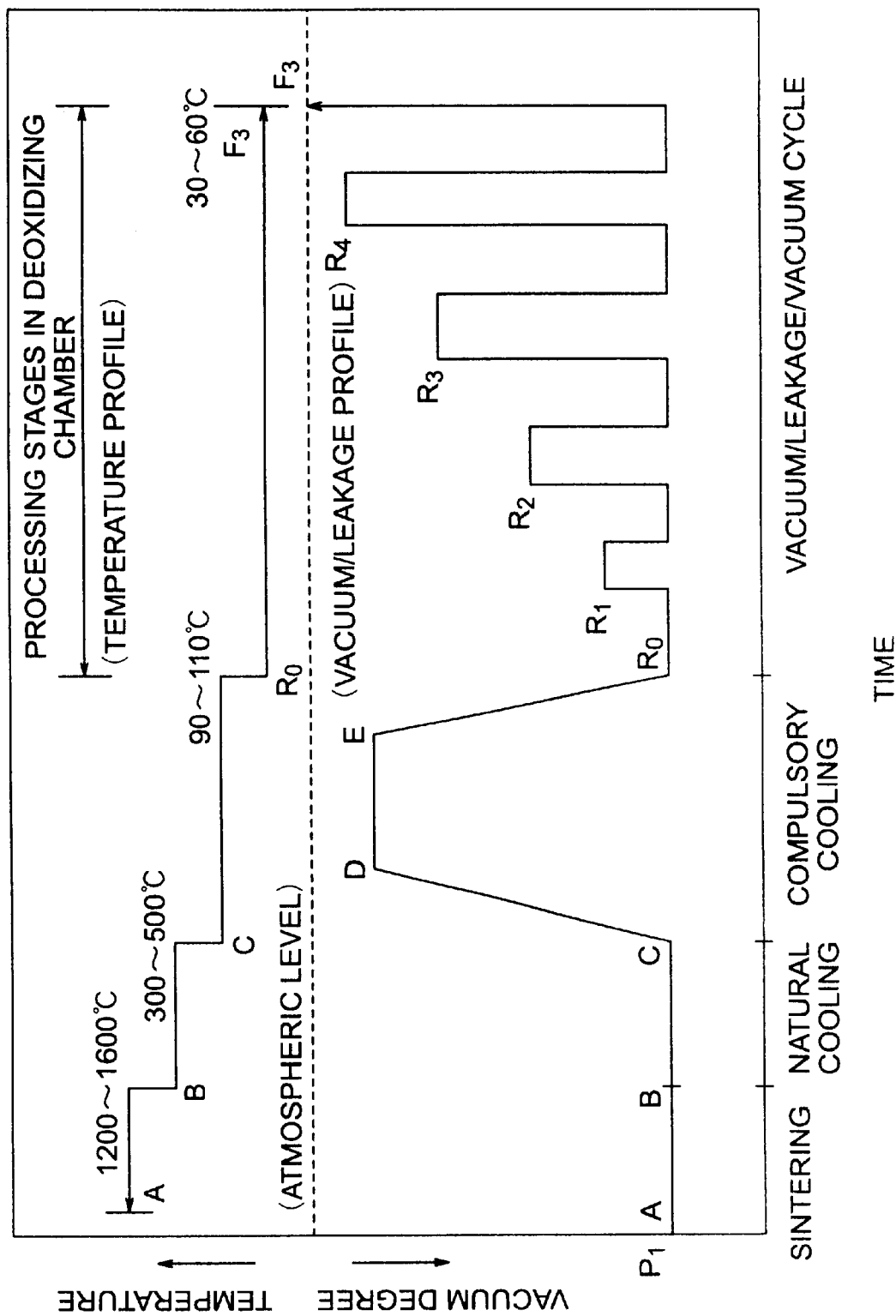

METHOD OF MANUFACTURING ANODE UNIT FOR SOLID ELECTROLYTIC CAPACITOR, ANODE UNIT FOR SOLID ELECTROLYTIC CAPACITOR, CONTINUOUS SINTERING APPARATUS, AND METHOD OF MANUFACTURING SECONDARY PARTICLES OF VALVE-ACTION METAL POWDER

BACKGROUND OF THE INVENTION

1. Field of the Invention

The present invention relates to a method of manufacturing an anode unit for a solid electrolytic capacitor and an anode unit. The invention relates, more particularly, to a method of manufacturing a sintered anode unit and a sintered anode unit capable of extremely decreasing a content of oxygen that is included in the sintered pellet and also capable of extremely lowering a leakage current of the capacitor, by using a fine metal powder having a valve action. This is for reducing the size of the capacitor and for improving the capacity of the capacitor.

The present invention also relates to a continuous sintering apparatus capable of taking out a sintered unit into the atmosphere by decreasing the content of oxygen included after sintering at a high temperature and in a high vacuum.

Further, the present invention also relates to a method of manufacturing secondary particles of a valve-action metal powder including a small content of oxygen that is excellent in flowability, compactibility or fillability and handleability at the time of a compacting, by using a metal powder of fine primary particles having a valve action.

2. Description of the Related Art

Conventionally, a sintered anode unit of an electrolytic capacitor has been prepared by press-molding or compacting a fine metal powder having a valve action, such as tantalum or aluminum, into a pellet and then by sintering this pellet at a high temperature and in a high vacuum to form a porous sintered anode unit.

In recent years, along with the trend that semiconductor integrated circuits are manufactured in increasingly fine and highly integrated small structures, personal computers and telephones are also provided as portable units in small and light-weigh structures. Under such circumstances, capacitors that are used in these units have also been required to be in small structures with a larger capacity.

In order to meet these requirements, metal powders of finer primary particle sizes have come to be used as a starting raw material having a valve action. This is for achieving a small structure with a larger capacity, by increasing the porosity of the sintered unit and increasing the surface area of the anode unit. For example, particularly in recent years, there have been used raw metal powders having primary particle sizes of 1.5 to 0.7 $\mu$m as an average particle size.

Further, in molding such a fine powder, the following practice is general from the viewpoint of the fillability, flowability, compactibility and handleability of the powder. at the time of the molding or compacting. It is general to use a metal powder that has been granulated to have secondary particles by a thermal cohesion of the powder under a heat treatment at a high temperature and in a high vacuum.

Japanese Patent Application Laid-open No. 2-310301 discloses a method of manufacturing a tantalum powder. According to this method, fine primary particles obtained at a high temperature and in a high vacuum are heat treated for 30 minutes at a high temperature of 1,400 to 1,550° C. in a vacuum furnace at a degree of vacuum of $10^{-3}$ Pa. Then, the thermally cohered powder is crushed lightly, and is deoxidized under the heating at 850° C. after adding of magnesium.

However, in general, when a metal powder becomes fine, the surface activity becomes high in proportion to the fineness. Particularly, a metal powder such as tantalum that has a valve action, for example, has its surface activity becoming higher along with the degree of fineness. Among metal powders having a valve action that are used as anode units for solid electrolytic capacitors, the metal powder like tantalum has a strong affinity with oxygen. It is general that when the metal powder of tantalum is used as a sintered unit, it is extremely difficult to decrease the content of oxygen included.

When this sintered unit is used as the anode unit for a solid electrolytic capacitor, for example, the increase in the content of oxygen in this sintered unit leads to a deterioration of the leakage current characteristics of the capacitor. Therefore, it is extremely important to lower the content of oxygen included in the sintered unit in the manufacture of the sintered unit.

Japanese Patent Application Laid-open No. 2-39417 discloses a method of manufacturing an electrolytic capacitor that uses a sintered unit as the anode unit. This sintered unit is prepared by sintering a metal powder having a valve action, at a high temperature and in a high vacuum, by paying attention to the content of oxygen included.

According to the proposal in the above publication, the metal powder as a starting raw material before the sintering has an oxygen density of 2,000 ppm or below. However, this publication does not describe a content of oxygen included after the metal powder has been sintered.

As described above, under the above situation, it is important that a sintered anode unit for a solid electrolytic capacitor is prepared as follows. A tantalum powder having a valve action (secondary powdered particles) is press-molded together with a tantalum line. Then, this molded unit is sintered in a high vacuum at a high temperature to form a porous pellet. This porous pellet must be the one that is not adsorbed physically and chemically by the oxygen in the atmosphere even when the sintered unit is taken into the atmosphere.

According to a conventional manufacturing practice, it is general that after a metal powder has been sintered in a high vacuum at a high temperature, the sintered unit is taken out into the atmosphere while lowering the high temperature of the sintered unit in an inert gas atmosphere. Therefore, according to this practice, a leakage to the vacuum occurs that the atmospheric gas is introduced during this process. Further, the surface of the sintered unit is also brought into contact with oxygen in the atmosphere after the sintered unit is taken out from the vacuum chamber.

As explained above, according to the conventional metal powder of a valve action like tantalum having a high affinity with oxygen, it can be understood that it is extremely difficult to lower the content of oxygen included in the sintered unit because of the contact of the sintered unit with oxygen in the atmosphere. This is against the trend of requirement for finer particles that are to be used for capacitors of a compact structure having a higher capacity.

Therefore, even if a known method of a forced cooling is employed under the inert gas atmosphere, there is the following difficulty. The conventional methods of manufacturing a sintered unit, including the methods described in the above publications, cannot sufficiently achieve a reduction in the content of oxygen included due to the contact with oxygen in the atmosphere and/or a reduction in the affinity of the metal powder and the sintered unit with oxygen. There is no sintering apparatus that can sufficiently meet the above requirements, either.

From the above, it can be said that according to the conventional manufacturing method, there is a trend of increasing the content of oxygen when the metal powder has finer primary particle sizes.

In order to decrease the leakage current by decreasing the content of oxygen, as one of the characteristics of the capacitors, the following manufacturing method is necessary. That is, for a metal powder having a high affinity with oxygen, it. is necessary to provide a manufacturing method that does not increase the content of oxygen included in the metal powder after the sintering as compared with the content of oxygen included before the sintering.

Thus, it is the current situation that there is no sintered anode unit for a solid electrolytic capacitor and there is no manufacturing method that can sufficiently satisfy the above-described requirements. In other words, it has not yet been possible to further decrease particle sizes of the starting raw material to meet the requirement for a more compact and a larger capacity of the capacitors in recent years. Further, it has not yet been possible to cancel a further increase in the affinity with oxygen and an increase in the content of oxygen included in the sintered unit due to the finer particle sizes.

SUMMARY OF THE INVENTION

It is an object of the present invention to provide a method of manufacturing a sintered anode unit for a solid electrolytic capacitor and a solid electrolytic capacitor capable of decreasing the content of oxygen that gives a bad influence to a capacitor leakage current to 0.1 ppm-/CV (CV represents a product of an electrostatic capacity and a formation voltage) and capable of extremely improving cost performance of time relating to a manufacturing process, even when a metal powder as a starting material of a valve action has an average primary particle size of 1.5 $\mu$m or below and when a sintered unit formed by sintering secondary particles provided by thermally cohering the primary particles in a high vacuum and at a high temperature is used as the anode unit for the solid electrolytic capacitor.

Further, it is another object of the invention to provide a tantalum sintered anode unit for a solid electrolytic capacitor as a sintered unit, by using a fine tantalum metal powder having a primary particle size of 1.5 $\mu$m or below based on the above manufacturing method.

Further, it is still another object of the invention to provide a method of manufacturing secondary particles of a valve-action metal powder having a small content of oxygen that are excellent in the flowability, compactibility (or fillability), and handleability of the metal powder at the time of press molding or compacting the metal powder, by thermally cohering the metal powder of a valve action having an average primary particle size of 1.5 $\mu$m or below under the heating.

In order to achieve the above objects, according to a first aspect of the present invention, there is provided a method of manufacturing a sintered anode unit for a solid electrolytic capacitor, in which a fine metal powder having a valve action is used of which average primary particle size is, for example, 1.5 $\mu$m or below, and a press-molded or compacted pellet of secondary particles is sintered to have a predetermined low content of oxygen, for example, 0.1 ppm/CV or below.

Further, according to another aspect of the invention, there is provided a continuous sintering apparatus that sinters a metal powder under a deoxidized atmosphere and that takes out a sintered unit including a decreased content of oxygen into the atmosphere. The apparatus has a sintering chamber, a natural cooling chamber, and a forced cooling chamber. The apparatus further has a gradual-oxidizing chamber that repeats, after a forced cooling, a cycle processing of returning a vacuum level to a predetermined high primary vacuum degree, leaking the atmospheric gas into vacuum to lower the vacuum degree, and then setting the sintered unit into a vacuum. Thus, by increasing the atmospheric leakage level step by step, the gradual-oxidizing chamber is finally set to the atmospheric pressure, and the sintered unit is taken out.

In other words, according to the method of manufacturing an anode unit for a solid electrolytic capacitor using this continuous sintering apparatus relating to the present invention, the pellet is sintered at a predetermined high temperature and in a predetermined vacuum degree. Then, the pellet is naturally cooled at the same predetermined primary vacuum degree. Thereafter, the pellet is shifted into an inert gas atmosphere, and is cooled compulsively.

Next, the pellet is shifted into a gradual-oxidizing chamber in the same predetermined primary vacuum degree, and a small volume of atmospheric gas is introduced to lower the. vacuum level. The chamber is returned to the predetermined primary vacuum degree again. Thus, the cycle of vacuum, atmospheric leakage and vacuum is repeated. After the leakage level is increased step by step to set the chamber to the atmospheric pressure by this cycle processing, the sintered pellet is taken out from the gradual-oxidizing chamber into the atmosphere.

Further, according to still another aspect of the invention, there is provided a sintered anode unit for a solid electrolytic capacitor using a tantalum metal powder having an average primary particle size of 1.5 $\mu$m or below, wherein the sintered anode unit includes a content of oxygen by 0.1 ppm/CV or below.

Further, according to still another aspect of the invention, there is provided a method of manufacturing secondary particles of a valve-action metal powder having particle sizes within a range of 10 to 200 $\mu$m and including a low predetermined content (ppm/CV) of oxygen, for example 0.1 ppm/CV or below, by using a fine metal powder of a valve action having primary particle sizes of 1.5 $\mu$m or below.

In other words, according to this method, the metal powder is thermally cohered in a predetermined high primary vacuum degree to have secondary particles. Then, the secondary particles are naturally cooled at a predetermined primary vacuum degree. Thereafter, the secondary particles are shifted into an inert gas atmosphere, and are cooled compulsively.

Next, the secondary particles are shifted into a gradual-oxidizing chamber in the same predetermined primary vacuum degree, and a small volume of atmospheric gas is introduced to lower the vacuum level. The chamber is returned to the predetermined primary vacuum degree again. Thus, the cycle of vacuum, atmospheric leakage and vacuum is repeated. After the leakage level is increased step by step to set the chamber to the atmospheric pressure by this cycle processing, the secondary particles are taken out from the gradual-oxidizing chamber into the atmosphere.

According to the present invention, the above-described method of manufacturing secondary particles and the method of manufacturing a sintered anode unit are employed. According to these methods, even when the average primary particle size of a valve-action metal powder is as fine as 1.5 μm or below as a starting raw material of the secondary particles and a porous sintered anode unit, an increase in the oxygen adsorption content can be restricted extremely as follows. After the secondary particles have been thermally cohered or the pellets have been sintered, they are subjected to the repetitive cycle processing of the vacuum, atmospheric leakage and vacuum many times in the gradual-oxidizing chamber of the continuous sintering apparatus. Based on the gradual increasing of the leakage level, heat discharging becomes always larger than the increase in the surface temperature even when the sintered unit and the secondary particles are brought into contact with oxygen during the atmospheric leakage. This is extremely different from the conventional processing method. Therefore, it is possible to extremely restrict the increase in the oxygen adsorption content. As a result, the secondary particles and the sintered unit can be taken out into the atmosphere by preventing heating and natural combustion.

As explained above according to the present invention, there is no risk of heating and combustion due to a natural oxidation, unlike the conventional method. Further, it is possible to extremely restrict the content of oxygen included, and it is possible to extremely reduce the processing time after the forced cooling. As a result, it is possible to extremely improve the time cost performance.

Further, according to the method of manufacturing secondary particles based on the cycle processing of vacuum, atmospheric leakage and vacuum in the gradual-oxidizing chamber, it is possible to remove the conventional deoxidizing processing by heated magnesium after the thermal cohesion. As a result, it is possible to simplify the process of making the secondary particles.

BRIEF DESCRIPTION OF THE DRAWINGS

FIG. 1 is a graph showing a process of manufacturing a sintered anode unit for a solid electrolytic capacitor using a metal powder having a valve action based on a continuous sintering apparatus of the present invention. The horizontal axis represents a time, and the vertical axis represents a temperature and a vacuum degree. This graph shows a cycle processing of vacuum, atmospheric leakage and vacuum, after cooling in an inert gas atmosphere after the sintering at a high temperature and in a high vacuum.

DETAILED DESCRIPTION OF THE PREFERRED EMBODIMENTS

Figure 2A:
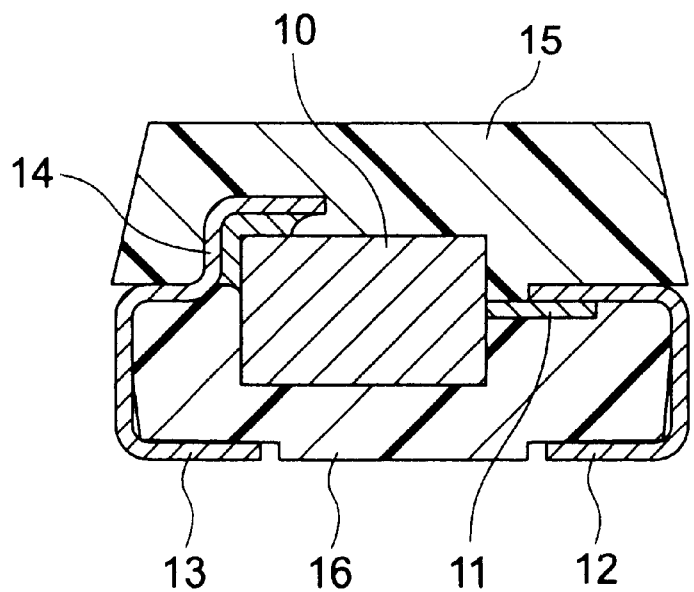
FIG. 2A is a cross-sectional view of a solid electrolytic capacitor.

A method of manufacturing secondary particles and a method of manufacturing a sintered anode unit relating to embodiments of the present invention will be explained below.

In view of the above, the present inventor has carried out detailed investigations in order to solve the conventional problems, by using a fine tantalum metal powder a high affinity with oxygen among metal powders having a valve action. After this tantalum metal powder has been sintered at a high temperature and in a high vacuum, the sintered pellet is rapidly cooled in an argon gas atmosphere like the conventional practice. Then, the pellet is placed in a high vacuum again without disposing it to the atmosphere. Thereafter, the atmospheric gas is leaked into the vacuum to lower the vacuum degree. As a result of repeating this cycle processing many times, the inventor has found that it is possible to take out the sintered unit into the atmosphere without increasing the surface temperature of the sintered unit, unlike the conventional practice. Thus, the inventor has completed the present invention.

A continuous sintering apparatus of the present invention is for sintering a metal powder in a deoxidized atmosphere to make it possible to manufacture a sintered unit by decreasing the content of oxygen included in the sintered unit when it is taken out into the atmosphere. In the continuous sintering apparatus of the present invention, there are provided a sintering chamber, a natural cooling chamber, and a forced cooling chamber. There is also provided a gradual-oxidizing chamber into which a sintered unit is shifted after the sintered unit has been cooled compulsively within the forced cooling chamber. This gradual-oxidizing chamber is used for carrying out a cycle processing of returning the sintered unit to a predetermined high primary vacuum degree again, leaking the atmospheric gas, and then setting a vacuum state. After increasing the atmospheric leakage level step by step to set the chamber to the atmospheric pressure, the sintered unit is taken out into the atmosphere.

FIG. 1 is a graph showing a process of manufacturing a sintered anode unit for a solid electrolytic capacitor using a metal powder having a valve action based on the continuous sintering apparatus of the present invention. The horizontal axis represents a time, and the vertical axis represents a temperature and a vacuum degree. This graph shows a cycle processing of vacuum, atmospheric leakage and vacuum, after cooling in an inert gas atmosphere after the sintering at a high temperature and in a high vacuum.

The process of manufacturing a sintered anode unit for a solid electrolytic capacitor using the continuous sintering apparatus provided with the gradual-oxidizing chamber according to the present invention will be explained below with reference to FIG. 1.

According to a process of manufacturing the sintered anode unit, first, a fine metal powder of a valve action having primary particle sizes of 1.5 μm or below is sintered to obtain a metal powder having secondary particles of particle sizes within a range of 10 to 200 μm, by a conventionally known molding method. Then, a pellet obtained from the metal powder of the secondary particles is sintered in sintered in a sintering chamber. This sintering is usually carried out under conditions of at a temperature within a range from 1,200 to 1,600° C., and in a vacuum degree within a range from $10^{-3}$ to $10^{-4}$ Pa (hereinafter, the high vacuum will be referred to as a high primary vacuum). A process A-B in FIG. 1 shows this sintering process.

Then, the sintered pellet is shifted into the natural cooling chamber, and is naturally cooled (a process B-C) in the high primary vacuum. Usually, the surface temperature of the sintered unit is lowered to a temperature range of 300 to 500° C. by this cooling. Then, the sintered pellet is shifted into the forced cooling chamber, and is compulsively cooled (a process C-D-E) in an inert gas atmosphere like an argon gas (Ar) of a deoxidized atmosphere (the vacuum degree in this case is lowered to a level near the atmospheric pressure by Ar). Thus, the surface temperature is lower to near 100° C.

Then, according to the present invention, the sintered pellet is shifted into the gradual-oxidizing chamber (a chamber for step by step oxidizing) of the continuous sintering apparatus of the present invention. This gradual-oxidizing chamber is set to the above-described predetermined high primary vacuum degree (corresponding to a vacuum degree of $R_0$ shown in FIG. 1). The sintered pellet is disposed in the high primary vacuum again.

Next, as shown by a profile of a vacuum/leakage shown in FIG. 1, a cycle processing of vacuum, atmospheric leakage and vacuum is repeated. As shown in FIG. 1, the vacuum degree is lowered step by step from $R_1$ to $R_2$, $R_3$ and to $R_4$, thereby gradually increasing the atmospheric leakage, to set the vacuum level to the atmospheric level. At this stage, the surface temperature of the sintered pellet that has been taken out into the atmosphere is within a range from 30 to 65° C.

According to a method of manufacturing secondary particles relating to the present invention, the sintering process A-B becomes a thermal cohesion process based on a heat treatment. The processing temperature is usually within a range from 1,000 to 1,400° C. (the processing time is about 30 minutes). Processing conditions at the subsequent stages including the process B-C, the process C-D-E, and the cycle process of vacuum, atmospheric leakage and vacuum, are substantially same as those of the sintered unit. Therefore, a detailed explanation of the method of manufacturing secondary particles will be omitted.

According to the method of manufacturing secondary particles in the present invention, the cycle processing of vacuum, atmospheric leakage, and vacuum makes it possible to extremely lower oxygen included in the sintered unit even when a metal powder having a valve action has an average primary particle size of fine 1.5 µm or below. It is possible to extremely lower the increase in the content of oxygen from the content included in the starting raw material, as compared with the increase in the content of oxygen according to the conventional sintering method.

Further, in the present invention, the above-described predetermined high primary vacuum degree ($P_1=R_0$) is usually also about $10^{-3}$ to $10^{-4}$ Pa. However, according to the needs, the predetermined high primary vacuum degree $R_0$ during the cycle processing may be set to $R_0<P_1$ instead of the vacuum levels shown in FIG. 1.

Further, in the present invention, the cycle time of the cycle processing of vacuum, atmospheric leakage, and vacuum in the gradual-oxidizing chamber is different depending on the type of metal of the sintered unit, particularly, a difference in the affinity with oxygen or the porosity of the sintered unit. Preferably, a required one cycle time is suitably set to within a range of 2 to 20 minutes. This can be processed within a range of 10 to 180 minutes.

It can be understood from the above that it is possible to extremely improve the time cost performance relating to the manufacturing process under the conditions of restricting the increase in the content of oxygen included in the sintered unit.

Further, in the manufacturing of secondary particles, it is possible to avoid the deoxidizing processing by magnesium under the heating after the thermal cohesion (secondary cohesion) that is disclosed in the above-described conventional example of Japanese Patent Application Laid-open No. 2-310301.

Further, while argon gas is suitable as an inert gas to be used for the deoxidizing atmospheric gas during the forced cooling after the sintering as described above, it is also possible to suitably use a nitrogen gas or a mixed gas of an argon gas and a nitrogen gas depending on the needs.

Further, in the present invention, it is also possible to use aluminum, titanium or niobium as a metal powder having a valve action.

As explained above, according to the manufacturing method of the present invention, it is possible to lower the content of oxygen included in the sintered unit in any one of the above-described metal powders having a valve action. Although the oxygen reduction content is different depending on the kind of metal, it is possible to restrict a predetermined content of oxygen included to 0.1 ppm/CV or below when tantalum is used that has a highest affinity with oxygen and that easily absorbs oxygen. In this case, when the content of oxygen included exceeds 0.1 ppm/CV, the leakage current increases and the capacitor leakage current characteristics are deteriorated.

Further, the restriction of the content of oxygen included can also be achieved in the manufacturing of secondary particles according to the present invention. For example, when a tantalum powder having a primary particle size of 1.5 µm is thermally cohered to obtain secondary particles of particle sizes within a range of 10 to 200 µm, it is possible to restrict the predetermined content of oxygen included to 0.1 ppm/CV or below.

Examples of the present invention will be explained below.

EXAMPLE 1

As shown in FIG. 1, a fine tantalum powder having an average primary particle size of 1.0 µm is thermally cohered to obtain secondary particles having an average particle size of 50 µm. The secondary particles are used to manufacture a tantalum compacted unit (pellet) based on a known conventional method. The pellet is continuously sintered in a vacuum continuous furnace at a temperature 1,400° C. and in a vacuum degree $10^{-4}$ Pa for 30 minutes (the process A-B) as shown in the profile of FIG. 1. The content of oxygen included in the secondary particles is 3,300 ppm/g.

Next, this pellet is shifted into a gradual-oxidizing chamber of a vacuum degree $R_0=10^{-3}$ Pa. Then, the cycle processing of vacuum ($R_0$), atmospheric leakage, and vacuum ($R_0$) is repeated by four cycles. The processing is carried out by changing the atmospheric leakage level step by step from $R_1$ (10 Pa) to $R_2$($10^2$ Pa), $R_3$ ($10^3$ Pa), and to $R_4$ ($1.3\times10^5$ Pa=the atmospheric pressure).

One cycle time in this processing is five minutes, and the total processing time is twenty minutes.

The obtained content of oxygen is 4,900 ppm/g. This value is converted into 0.09 ppm/CV of the pellet.

Figure 2B:
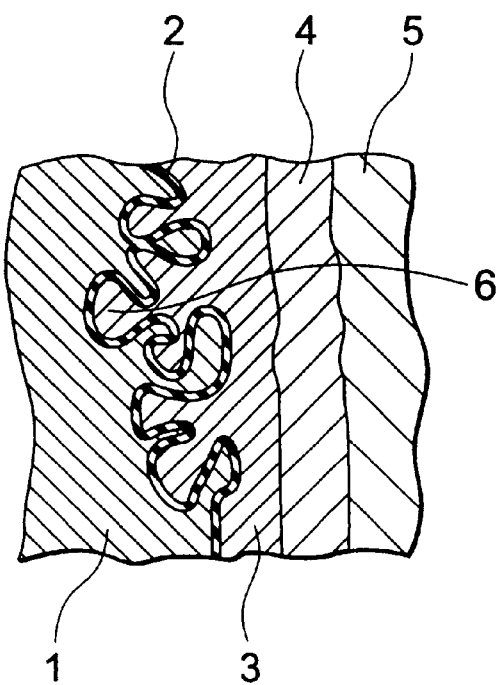
FIG. 2B is an enlarged cross-sectional view of a sintered anode unit used for this solid electrolytic capacitor.

FIG. 2A is a cross-sectional view of a solid electrolytic capacitor, and FIG. 2B is an enlarged cross-sectional view of a sintered anode unit used for this solid electrolytic capacitor. Then, the pellet is used to manufacture a solid electrolytic capacitor element 10 consisting of a pellet anode unit 1, a dielectric 2, a solid electrolyte 3, a graphite 4, and a silver paste 5. As shown in the enlarged cross-sectional view in FIG. 2B, the pellet anode unit 1 is porous as indicated by 6, and the dielectric 2 ($Ta_2O_5$) is formed on the surface of the anode unit 1 in the solid electrolytic capacitor element 10. The solid electrolyte 3 ($MnO_2$) is formed on the surface of the dielectric 2, and the silver paste 5 is formed through the graphite 4. In the solid electrolytic capacitor manufactured by using the solid electrolytic capacitor element 10, an electrode 11 is connected to an anode side of the solid electrolytic capacitor element 10, and an anode terminal 12 is connected to this electrode 11, as shown in FIG. 2A. A cathode terminal 13 is connected to a cathode side of the solid electrolytic capacitor element 10 through a solder 14. The solid electrolytic capacitor element 10, the anode terminal 13 and the cathode terminal 12 are covered by mold resins 15 and 16. The anode terminal 12 and the cathode terminal 13 are bent to follow the mold resin 16 beneath these terminals respectively. A wet current (an LC value) of the capacity element 10 is measured according to a wet method. The measured value is 16.8 $\mu A/\mu FV$.

<A method of Measuring the Content of Oxygen Included>

Oxygen and nitrogen included in a sintered unit are extracted by an inert gas-impulse heat melting method using an oxygen/nitrogen analyzer EMGA-520 (or 620) that is manufactured by Horiba Seisakusho. The extracted oxygen is measured as carbon oxide (CO) by a high-sensitivity non-dispersion infrared detector.

Comparative Example 1

Figure 3:
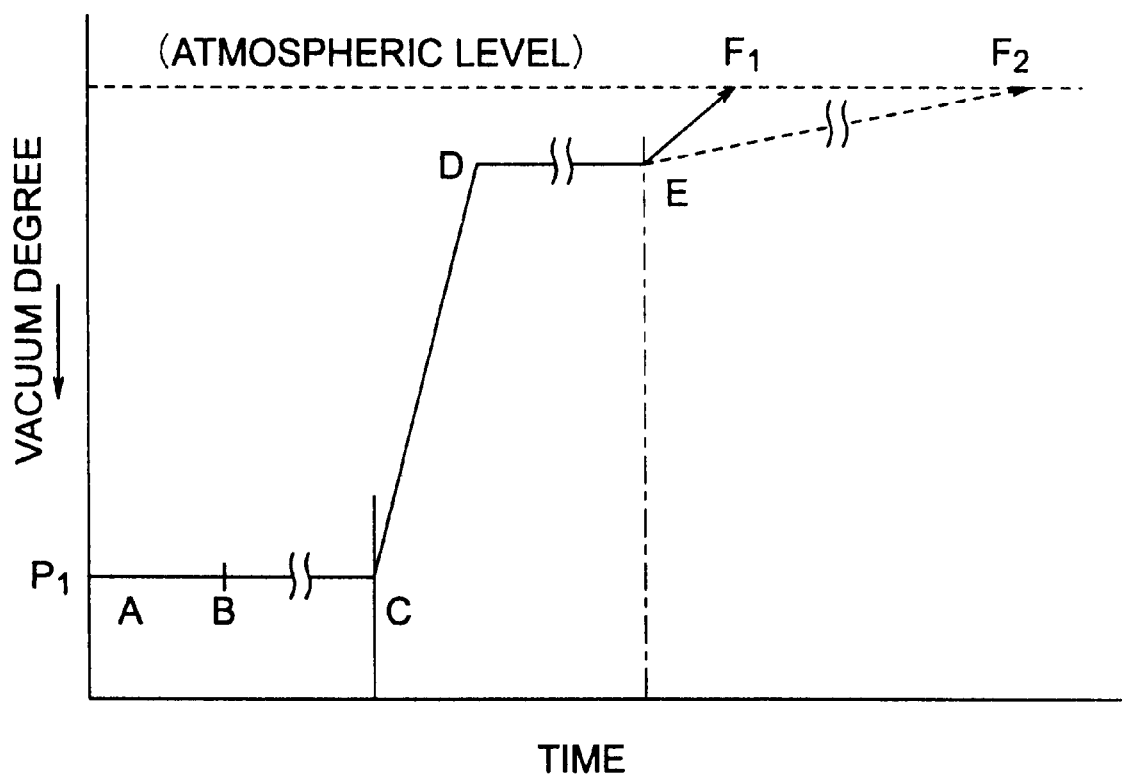
FIG. 3 is a graph showing a conventional process of manufacturing a sintered anode unit for a solid electrolytic capacitor using a metal powder having a valve action. The horizontal axis represents a time, and the vertical axis represents a temperature and a vacuum degree. This graph shows a process of a cooling in an inert gas atmosphere after sintering at a high temperature and in a high vacuum, and then an atmospheric leakage.

FIG. 3 is a graph showing a conventional process of manufacturing a sintered anode unit for a solid electrolytic capacitor using a metal powder having a valve action. The horizontal axis represents a time, and the vertical axis represents a temperature and a vacuum degree. This graph shows a process of a cooling in an inert gas atmosphere after sintering at a high temperature and in a high vacuum, and then an atmospheric leakage. In the comparative example 1, a tantalum metal powder pellet is subjected to a process of sintering (a process A-B), natural cooling (a process B-C), and forced cooling (a process C-D-E) under a similar condition to that in the example 1, as shown in the profile in FIG. 3. Then, the pellet is taken out into the atmosphere (a process $E-F_1$) as one example of the conventional sintering method. The content of oxygen included in the sintered unit is 5,500 ppm/g.

This value is converted into 0.110 ppm/CV of the pellet. By using this pellet, a solid electrolytic capacitor element is manufactured in a similar manner to that of the example 1. A wet current (an LC value) of the capacity element is measured according to a wet method. The measured value is 24.4 $\mu A/\mu FV$.

Comparative Example 2

In the second comparative example, out of a process including A-B, B-C, C-D-E, and $E-F_2$ shown in FIG. 3, the process up to a forced cooling of a pellet in an Ar inert gas atmosphere (the process C-D-E) is carried out in a similar manner to that of the comparative example 1. Thereafter, the pellet is further gradually cooled in the inert gas atmosphere over 24 hours. Then, the sintered unit is taken out into the atmosphere (the $E-F_2$ process). The content of oxygen included in the sintered unit is 5,300 ppm/g. This value is similarly converted into 0.106 ppm/CV of the pellet. A value of a wet current (an LC value) of the capacity element measured in a similar manner is 21.4 $\mu A/\mu FV$.

As explained above, a fine valve-action metal powder is used as a starting raw material, and the pellet is sintered. Thereafter the pellet is subjected to the cycle processing of vacuum, atmospheric leakage and vacuum as shown in the profile of FIG. 1 by using the solid electrolytic capacitor of the present invention. Based on this processing, it is possible to carry out the sintering by extremely restricting the content of oxygen included in the sintered unit while extremely decreasing the processing time. Furthermore, when the sintered unit obtained is used for the anode unit for a solid electrolytic capacitor, the capacitor characteristics (leakage current) are not deteriorated.

What is claimed is:

1. A method of manufacturing a sintered anode unit for a solid electrolytic capacitor having a low content of oxygen, comprising the steps of:

sintering a pellet obtained by press-molding or compacting a metal powder having a valve action, at a predetermined high temperature and in a primary vacuum degree;

performing natural cooling of the pellet in the primary vacuum degree;

thereafter shifting the pellet into an inert gas atmosphere;

performing force cooling of the pellet in the inert gas atmosphere;

shifting the pellet into a gradual-oxidizing chamber of the primary vacuum degree;

leaking the atmospheric gas into the gradual-oxidizing chamber to lower the vacuum in the gradual-oxidizing chamber than the primary vacuum degree;

returning the vacuum level in the gradual-oxidizing chamber to the primary vacuum degree;

repeating this cycle of vacuum, atmospheric leakage, and vacuum in the gradual-oxidizing chamber, thereby increasing the atmospheric leakage level step by step to set the vacuum level in the gradual-oxidizing chamber to the atmospheric pressure; and taking out the sintered pellet from the gradual-oxidizing chamber into the atmosphere.

2. The method of manufacturing a sintered anode unit for a solid electrolytic capacitor according to claim 1, wherein an average primary particle size of the metal powder having a valve action is 1.5 $\mu m$ or below.

3. The method of manufacturing a sintered anode unit for a solid electrolytic capacitor according to claim 1, wherein the predetermined high primary vacuum degree is $10^{-3}$ to $10^{-4}$ Pa.

4. The method of manufacturing a sintered anode unit for a solid electrolytic capacitor according to claim 1, wherein a time required for one cycle of the cycle processing of vacuum, atmospheric leakage, and vacuum in the gradual-oxidizing chamber is 2 to 20 minutes, and a total cycle processing time is 10 to 180 minutes.

5. The method of manufacturing a sintered anode unit for a solid electrolytic capacitor according to claim 1, wherein the inert gas is an argon gas, a nitrogen gas, or a mixed gas of these two gases.

6. The method of manufacturing a sintered anode unit for a solid electrolytic capacitor according to claim 1, wherein the metal powder having a valve action is a powder of a metal selected from a group consisting aluminum, titanium, tantalum, and niobium.

7. The method of manufacturing a sintered anode unit for a solid electrolytic capacitor according to claim 1, wherein the metal powder having a valve action is tantalum powder, and the predetermined content of oxygen included is 0.1 ppm/CV or below.

8. A sintered anode unit for a solid electrolytic capacitor, wherein the sintered anode unit is a sintered body of a tantalum metal powder having an average primary particle size of 1.5 μm or below, and including oxygen by 0.1 ppm/CV or below.

9. A continuous sintering apparatus comprising:

a sintering chamber for sintering a pellet under a deoxidized atmosphere in the primary vacuum degree;

a natural cooling chamber for cooling the pellet in the primary vacuum degree in a natural cooling state;

a forced cooling chamber for cooling the pellet in the inert gas atmosphere; and a gradual-oxidizing chamber for returning a pellet to the primary vacuum degree again after forced-cooling, and repeating a cycle processing of vacuum, atmospheric leakage, and vacuum, by increasing an atmospheric leakage level step by step, to set the vacuum in the gradual-oxidizing chamber to the atmospheric pressure, and finally taking the sintered pellet out into the atmosphere.

10. A method of manufacturing secondary particles of a valve-action metal powder having particle sizes within a range of 10 to 200 μm and including a low content of oxygen (ppm/CV), by using a metal powder of a valve action having an average primary particle size of 1.5 μm or below, the method comprising the steps of:

heat treating the metal powder in a primary vacuum degree, to provide secondary particles;

performing natural cooling of the secondary particles in the primary vacuum degree;

thereafter shifting the secondary particles into an inert gas atmosphere;

performing force cooling of the secondary particles in the inert gas atmosphere;

shifting the secondary particles into a gradual-oxidizing chamber of the primary vacuum degree, leaking the atmospheric gas into the gradual-oxidizing chamber to lower the vacuum degree of the gradual-oxidizing chamber, and returning the vacuum level to the primary vacuum degree, and repeating this cycle of vacuum, atmospheric leakage, and vacuum, thereby increasing the atmospheric leakage level step by step, to set the vacuum level of the gradual-oxidizing chamber to the atmospheric pressure; and taking out the secondary particles from the gradual-oxidizing chamber into the atmosphere.

11. The method of manufacturing secondary particles of a valve-action metal powder according to claim 10, wherein the metal powder is tantalum, and the content of oxygen included is 0.1 ppm/CV or below.

12. The method of manufacturing secondary particles of a valve-action metal powder according to claim 10, wherein the atmospheric gas of the inert gas is an argon gas, a nitrogen gas, or a mixed gas of these two gases.

13. The method of manufacturing secondary particles of a valve-action metal powder according to claim 11, wherein the atmospheric gas of the inert gas is an argon gas, a nitrogen gas, or a mixed gas of these two gases.

* * * * *